US008236420B2

(12) United States Patent
Skårman et al.

(10) Patent No.: US 8,236,420 B2
(45) Date of Patent: Aug. 7, 2012

(54) FERROMAGNETIC POWDER COMPOSITION AND METHOD FOR ITS PRODUCTION

(75) Inventors: Björn Skårman, Höganäs (SE); Zhou Ye, Lerberget (SE); Hilmar Vidarsson, Munka Ljungby (SE)

(73) Assignee: Höganäs AB (Publ), Höganäs (SE)

( * ) Notice: Subject to any disclaimer, the term of this patent is extended or adjusted under 35 U.S.C. 154(b) by 131 days.

(21) Appl. No.: 12/922,360

(22) PCT Filed: Mar. 18, 2009

(86) PCT No.: PCT/SE2009/050278
§ 371 (c)(1),
(2), (4) Date: Oct. 1, 2010

(87) PCT Pub. No.: WO2009/116938
PCT Pub. Date: Sep. 24, 2009

(65) Prior Publication Data

US 2011/0006246 A1 Jan. 13, 2011

Related U.S. Application Data

(60) Provisional application No. 61/193,822, filed on Dec. 29, 2008.

(30) Foreign Application Priority Data

Mar. 20, 2008 (SE) ...................................... 0800659

(51) Int. Cl.
*B32B 5/16* (2006.01)

(52) U.S. Cl. .................. 428/402; 428/403; 428/694 BP; 428/694 BF; 428/694 BA; 427/212

(58) Field of Classification Search .................. 428/402, 428/403, 694 BP, 694 BF, 694 BA; 427/212
See application file for complete search history.

(56) References Cited

U.S. PATENT DOCUMENTS 4,475,946 A * 10/1984 Matsufuji et al. ............. 428/405
4,601,765 A 7/1986 Soileau et al.
4,820,338 A * 4/1989 Ochiai et al. .................... 75/233
6,149,704 A 11/2000 Moro et al.
6,309,748 B1 10/2001 Lashmore et al.
6,348,265 B1 2/2002 Jansson et al.
7,153,594 B2 * 12/2006 Kejzelman et al. ........... 428/838
7,235,208 B2 6/2007 Moro
7,718,082 B2 * 5/2010 Vidarsson et al. ......... 252/62.55
2003/0073022 A1 * 4/2003 Hultman et al. ......... 430/111.31
2008/0044679 A1 2/2008 Maeda et al.
2010/0028195 A1 2/2010 Maeda et al.

FOREIGN PATENT DOCUMENTS

JP 2006-024869 A 1/2006
JP 2006-233295 A 9/2006
JP 2006-245183 A 9/2006
JP 2007-088156 A 4/2007
JP WO 2007-129154 A 5/2007
WO 2004-056508 A1 7/2004
WO WO2004056508 * 7/2004

OTHER PUBLICATIONS

International Search Report (PCT/ISA/210) issued on Jun. 24, 2009, by Japanese Patent Office as the International Searching Authority for International Application No. PCT/SE2009/050278.
Written Opinion (PCT/ISA/237) issued on Jun. 24, 2009, by Japanese Patent Office as the International Searching Authority for International Application No. PCT/SE2009/050278.

* cited by examiner

*Primary Examiner* — Leszek Kiliman
(74) *Attorney, Agent, or Firm* — Buchanan Ingersoll & Rooney PC

(57) ABSTRACT

A ferromagnetic powder composition is described comprising soft magnetic iron-based core particles, wherein the surface of the core particles is provided with a first inorganic insulating layer and at least one metal-organic layer, located outside the first layer, of a metal-organic compound having the following general formula: $(R_1[(R_1)x(R_2)_y(MO_{n-1})]_nR_1$, wherein M is a central atom selected from Si, Ti, Al, or Zr; O is oxygen; $R_1$ is a hydrolysable group; $R_2$ is an organic moiety and wherein at least one R2 contains at least one amino group; wherein n is the number of repeatable units being an integer between 1 and 20; wherein the x is an integer between 0 and 1; wherein y is an integer between 1 and 2; wherein a metallic or semi-metallic particulate compound having a Mohs hardness of less than 3.5 is adhered to at least one metal-organic layer; and wherein the powder composition further comprises a particulate lubricant. A process is additionally provided for producing the composition and a method for the manufacturing of soft magnetic composite components prepared from the composition, as well as the obtained component.

20 Claims, No Drawings

FERROMAGNETIC POWDER COMPOSITION AND METHOD FOR ITS PRODUCTION

FIELD OF THE INVENTION

The present invention relates to a powder composition comprising an electrically insulated iron-based powder and to a process for producing the same. The invention further concerns a method for the manufacturing of soft magnetic composite components prepared from the composition, as well as the obtained component.

BACKGROUND OF THE INVENTION

Soft magnetic materials are used for applications, such as core materials in inductors, stators and rotors for electrical machines, actuators, sensors and transformer cores. Traditionally, soft magnetic cores, such as rotors and stators in electric machines, are made of stacked steel laminates. Soft Magnetic Composite (SMC) materials are based on soft magnetic particles, usually iron-based, with an electrically insulating coating on each particle. The SMC components are obtained by compacting the insulated particles using a traditional powder metallurgical (PM) compaction process, optionally together with lubricants and/or binders. By using the powder metallurgical technique it is possible to produce materials having a higher degree of freedom in the design of the SMC component than by using the steel laminates, as the SMC material can carry a three dimensional magnetic flux, and as three dimensional shapes can be obtained by the compaction process.

Two key characteristics of an iron core component are its magnetic permeability and core loss characteristics. The magnetic permeability of a material is an indication of its ability to become magnetised or its ability to carry a magnetic flux. Permeability is defined as the ratio of the induced magnetic flux to the magnetising force or field intensity. When a magnetic material is exposed to a varying field, energy losses occur due to both hysteresis losses and eddy current losses. The hysteresis loss (DC-loss), which constitutes the majority of the total core losses in most motor applications, is brought about by the necessary expenditure of energy to overcome the retained magnetic forces within the iron core component. The forces can be minimized by improving the base powder purity and quality, but most importantly by increasing the temperature and/or time of the heat treatment (i.e. stress release) of the component. The eddy current loss (AC-loss) is brought about by the production of electric currents in the iron core component due to the changing flux caused by alternating current (AC) conditions. A high electrical resistivity of the component is desirable in order to minimise the eddy currents. The level of electrical resistivity that is required to minimize the AC losses is dependent on the type of application (operating frequency) and the component size.

Research in the powder-metallurgical manufacture of magnetic core components using coated iron-based powders has been directed to the development of iron powder compositions that enhance certain physical and magnetic properties without detrimentally affecting other properties of the final component. Desired component properties include e.g. a high permeability through an extended frequency range, low core losses, high saturation induction, and high mechanical strength. The desired powder properties further include suitability for compression moulding techniques, which means that the powder can be easily moulded to a high density component, which can be easily ejected from the moulding equipment without damages on the component surface.

Examples of published patents are outlined below.

U.S. Pat. No. 6,309,748 to Lashmore describes a ferromagnetic powder having a diameter size of from about 40 to about 600 microns and a coating of inorganic oxides disposed on each particle.

U.S. Pat. No. 6,348,265 to Jansson teaches an iron powder coated with a thin phosphorous and oxygen containing coating, the coated powder being suitable for compaction into soft magnetic cores which may be heat treated.

U.S. Pat. No. 4,601,765 to Soileau teaches a compacted iron core which utilizes iron powder which first is coated with a film of an alkali metal silicate and then over-coated with a silicone resin polymer.

U.S. Pat. No. 6,149,704 to Moro describes a ferromagnetic powder electrically insulated with a coating of a phenol resin and/or silicone resin and optionally a sol of titanium oxide or zirconium oxide. The obtained powder is mixed with a metal stearate lubricant and compacted into a dust core.

U.S. Pat. No. 7,235,208 to Moro teaches a dust core made of ferromagnetic powder having an insulating binder in which the ferromagnetic powder is dispersed, wherein the insulating binder comprises a trifunctional alkyl-phenyl silicone resin and optionally an inorganic oxide, carbide or nitride.

Further documents within the field of soft-magnetics are Japanese patent application JP 2005-322489, having the publication number JP 2007-129154, to Yuuichi; Japanese patent application JP 2005-274124, having the publication number JP 2007-088156, to Maeda; Japanese patent application JP 2004-203969, having the publication no JP 2006-0244869, to Masaki; Japaneese patent application 2005-051149, having the publication no 2006-233295, to Ueda and Japaneese patent application 2005-057193, having the publication no 2006-245183, to Watanabe.

OBJECTS OF THE INVENTION

One object of the invention is to provide an iron-based powder composition, comprising an electrically insulated iron-based powder, to be compacted into soft magnetic components having high strength, which component can be heat treated at an optimal heat treatment temperature without the electrically insulated coating of the iron-based powder being deteriorated.

One object of the invention is to provide an iron-based powder composition comprising an electrically insulated iron-based powder, to be compacted into soft magnetic components having high strength, high maximum permeability, and high induction while minimizing hysteresis loss and keeping Eddy current loss at a low level.

One object of the invention is to provide a method for producing the iron-based powder composition, without the need for any toxic or environmental unfavourable solvents or drying procedures.

One object is to provide a process for producing a compacted, and optionally heat treated, soft magnetic iron-based composite component having low core loss in combination with sufficient mechanical strength and acceptable magnetic flux density (induction) and maximal permeability.

SUMMARY OF THE INVENTION

To achieve at least one of the above-mentioned objects and/or further objects not mentioned, which will appear from the following description, the present invention concerns a ferromagnetic powder composition comprising soft magnetic iron-based core particles, wherein the surface of the core particles is provided with a first phosphorous-based inorganic insulating layer and at least one metal-organic layer, located outside the first layer, of a metal-organic compound having the following general formula:

$$R_1[(R_1)_x(R_2)_y(MO_{n-1})]_n R_1$$

wherein M is a central atom selected from Si, Ti, Al, or Zr;
O is oxygen;
$R_1$ is a hydrolysable group;
$R_2$ is an organic moiety and wherein at least one $R_2$ contains at least one amino group;
wherein n is the number of repeatable units being an integer between 1 and 20;
wherein x is an integer between 0 and 1;
wherein y is an integer between 1 and 2;

wherein a metallic or semi-metallic particulate compound having a Mohs hardness of less than 3.5 being adhered to at least one metal-organic layer; and wherein the powder composition further comprises a particulate lubricant.

The invention further concerns a process for the preparation of a ferromagnetic powder composition comprising: a) mixing soft magnetic iron-based core particles, the surface of the core particles being electrically insulated by a phosphorous-based inorganic insulating layer, with a metal-organic compound as above; b) optionally mixing the obtained particles with a further metal-organic compound as above; c) mixing the powder with a metallic or semi-metallic particulate compound having a Moh's hardness of less than 3.5; and d) mixing the powder with a particulate lubricant. Step c may optionally, in addition of after step b, be performed before step b, or instead of after step b, be performed before step b.

The invention further concerns a process for the preparation of soft magnetic composite materials comprising: uniaxially compacting a composition according to the invention in a die at a compaction pressure of at least about 600 MPa; optionally pre-heating the die to a temperature below the melting temperature of the added particulate lubricant; ejecting the obtained green body; and optionally heat-treating the body. A composite component according to the invention will typically have a content of P between 0.01-0.1% by weight, a content of added Si to the base powder between 0.02-0.12% by weight, and a content of Bi between 0.05-0.35% by weight.

DETAILED DESCRIPTION OF THE INVENTION

Base Powder

The iron-based soft magnetic core particles may be of a water atomized, a gas atomized or a sponge iron powder, although a water atomized powder is preferred.

The iron-based soft magnetic core particles may be of selected from the group consisting of essentially pure iron, alloyed iron Fe—Si having up to 7% by weight, preferably up to 3% by weight of silicon, alloyed iron selected from the groups Fe—Al, Fe—Si—Al, Fe—Ni, Fe—Ni—Co, or combinations thereof. Essentially pure iron is preferred, i.e. iron with inevitable impurities.

The particles may be spherical or irregular shaped, irregular shaped particles are preferred. The AD may be between 2.8 and 4.0 g/cm$^3$, preferably between 3.1 and 3.7 g/cm$^3$.

The average particle size of the iron-based core particles is between 25 and 600 μm, preferably between 45 and 400 μm, most preferably between 60 and 300 μm.

First Coating Layer (Inorganic)

The core particles are provided with a first inorganic insulating layer, which preferably is phosphorous-based. This first coating layer may be achieved by treating iron-based powder with phosphoric acid solved in either water or organic solvents. In water-based solvent rust inhibitors and tensides are optionally added. A preferred method of coating the iron-based powder particles is described in U.S. Pat. No. 6,348,265. The phosphatizing treatment may be repeated. The phosphorous based insulating inorganic coating of the iron-based core particles is preferably without any additions such as dopants, rust inhibitors, or surfactants.

The content of phosphate in layer 1 may be between 0.01 and 0.1 wt % of the composition.

Metal-Organic Layer (Second Coating Layer)

At lest one metal-organic layer is located outside the first phosphorous-based layer. The metal-organic layer is of a metal-organic compound having the general formula:

$$R_1[(R_1)_x(R_2)_y(MO_{n-1})]_n R_1$$

wherein:
M is a central atom selected from Si, Ti, Al, or Zr;
O is oxygen;
$R_1$ is a hydrolysable group;
$R_2$ is an organic moiety and wherein at least one $R_2$ contains at least one amino group;
wherein n is the number of repeatable units being an integer between 1 and 20;
wherein x is an integer between 0 and 1; wherein y is an integer between 1 and 2 (x may thus be 0 or 1 and y may be 1 or 2).

The metal-organic compound may be selected from the following groups: surface modifiers, coupling agents, or cross-linking agents.

$R_1$ in the metal-organic compound may be an alkoxy-group having less than 4, preferably less than 3 carbon atoms.

$R_2$ is an organic moiety, which means that the $R_2$-group contains an organic part or portion. $R_2$ may include 1-6, preferably 1-3 carbon atoms. $R_2$ may further include one or more hetero atoms selected from the group consisting of N, O, S and P. The $R_2$ group may be linear, branched, cyclic, or aromatic.

$R_2$ may include one or more of the following functional groups: amine, diamine, amide, imide, epoxy, hydroxyl, ethylene oxide, ureido, urethane, isocyanato, acrylate, glyceryl acrylate, benzyl-amino, vinyl-benzyl-amino. The $R_2$ group may alter between any of the mentioned functional $R_2$-groups and a hydrophobic alkyl group with repeatable units.

The metal-organic compound may be selected from derivates, intermediates or oligomers of silanes, siloxanes and silsesquioxanes or the corresponding titanates, aluminates or zirconates.

According to one embodiment at least one metal-organic compound in one metal-organic layer is a monomer (n=1).

According to another embodiment at least one metal-organic compound in one metal-organic layer is an oligomer (n=2-20).

According to another embodiment the metal-organic layer located outside the first layer is of a monomer of the metal-organic compound and wherein the outermost metal-organic layer is of an oligomer of the metal-organic compound. The chemical functionality of the monomer and the oligomer is necessary not same. The ratio by weight of the layer of the monomer of the metal-organic compound and the layer of the oligomer of the metal-organic compound may be between 1:0 and 1:2, preferably between 2:1-1:2.

If the metal-organic compound is a monomer it may be selected from the group of trialkoxy and dialkoxy silanes, titanates, aluminates, or zirconates. The monomer of the metal-organic compound may thus be selected from 3-aminopropyl-trimethoxysilane, 3-aminopropyl-triethoxysilane, 3-aminopropyl-methyl-diethoxysilane, N-aminoethyl-3-aminopropyl-trimethoxysilane, N-aminoethyl-3-aminopropyl-methyl-dimethoxysilane, 1,7-bis(triethoxysilyl)-4-azaheptan, triamino-functional propyl-trimethoxysilane, 3-ureidopropyl-triethoxysilane, 3-isocyanatopropyl-triethoxysilane, tris(3-trimethoxysilylpropyl)-isocyanurate, 0-(propargyloxy)-N-(triethoxysilylpropyl)-urethane, 1-aminomethyl-triethoxysilane, 1-aminoethyl-methyl-dimethoxysilane, or mixtures thereof.

An oligomer of the metal-organic compound may be selected from alkoxy-terminated alkyl-alkoxy-oligomers of silanes, titantes, aluminates, or zirconates. The oligomer of the metal-organic compound may thus be selected from methoxy, ethoxy or acetoxy-terminated amino-silsesquioxanes, amino-siloxanes, oligomeric 3-aminopropyl-methoxy-silane, 3-aminopropyl/propyl-alkoxy-silanes, N-aminoethyl-3-aminopropyl-alkoxy-silanes, or N-aminoethyl-3-aminopropyl/methyl-alkoxy-silanes or mixtures thereof.

The total amount of metal-organic compound may be 0.05-0.6%, preferably 0.05-0.5%, more preferably 0.1-0.4%, and most preferably 0.2-0.3% by weight of the composition. These kinds of metal-organic compounds may be commercially obtained from companies, such as Evonik Ind., Wacker Chemie AG, Dow Corning, etc.

The metal-organic compound has an alkaline character and may also include coupling properties i.e. a so called coupling agent which will couple to the first inorganic layer of the iron-based powder. The substance should neutralise the excess acids and acidic bi-products from the first layer. If coupling agents from the group of aminoalkyl alkoxy-silanes, -titanates, -aluminates, or -zirconates are used, the substance will hydrolyse and partly polymerise (some of the alkoxy groups will be hydrolysed with the formation of alcohol accordingly). The coupling or cross-linking properties of the metal-organic compounds is also believed to couple to the metallic or semi-metallic particulate compound which may improve the mechanical stability of the compacted composite component.

Metal or Semi-Metallic Particulate Compound

The coated soft magnetic iron-based powder should also contain at least one compound, a metallic or semi-metallic particulate compound. The metallic or semi-metallic particulate compound should be soft having Mohs hardness less than 3.5 and constitute of fine particles or colloids. The compound may preferably have an average particle size below 5 μm, preferably below 3 μm, and most preferably below 1 μm. The metallic or semi-metallic particulate compound may have a purity of more than 95%, preferably more than 98%, and most preferably more than 99% by weight. The Mohs hardness of the metallic or semi-metallic particulate compound is preferably 3 or less, more preferably 2.5 or less. $SiO_2$, $Al_2O_3$, MgO, and $TiO_2$ are abrasive and have a Mohs hardness well above 3.5 and is not within the scope of the invention. Abrasive compounds, even as nano-sized particles, cause irreversible damages to the electrically insulating coating giving poor ejection and worse magnetic and/or mechanical properties of the heat-treated component.

The metallic or semi-metallic particulate compound may be at least one selected from the group: lead, indium, bismuth, selenium, boron, molybdenum, manganese, tungsten, vanadium, antimony, tin, zinc, cerium.

The metallic or semi-metallic particulate compound may be an oxide, hydroxide, hydrate, carbonate, phosphate, fluorite, sulphide, sulphate, sulphite, oxychloride, or a mixture thereof.

According to a preferred embodiment the metallic or semi-metallic particulate compound is bismuth, or more preferably bismuth (III) oxide. The metallic or semi-metallic particulate compound may be mixed with a second compound selected from alkaline or alkaline earth metals, wherein the compound may be carbonates, preferably carbonates of calcium, strontium, barium, lithium, potassium or sodium.

The metallic or semi-metallic particulate compound or compound mixture may be present in an amount of 0.05-0.5%, preferably 0.1-0.4%, and most preferably 0.15-0.3% by weight of the composition.

The metallic or semi-metallic particulate compound is adhered to at least one metal-organic layer. In one embodiment of the invention the metallic or semi-metallic particulate compound is adhered to the outermost metal-organic layer.

Lubricant

The powder composition according to the invention comprises a particulate lubricant. The particulate lubricant plays an important role and enables compaction without the need of applying die wall lubrication. The particulate lubricant may be selected from the group consisting of primary and secondary fatty acid amides, trans-amides (bisamides) or fatty acid alcohols. The lubricating moiety of the particulate lubricant may be a saturated or unsaturated chain containing between 12-22 carbon atoms. The particulate lubricant may preferably be selected from stearamide, erucamide, stearyl-erucamide, erucyl-stearamide, behenyl alcohol, erucyl alcohol, ethylene-bisstearmide (i.e. EBS or amide wax). The particulate lubricant may be present in an amount of 0.15-0.55%, preferably 0.2-0.4% by weight of the composition.

Preparation Process of the Composition

The process for the preparation of the ferromagnetic powder composition according to the invention comprise: a) mixing soft magnetic iron-based core particles, the surface of the core particles being electrically insulated by a phosphorous-based inorganic insulating layer, with a metal-organic compound as disclosed above; b) optionally mixing the obtained particles with a further metal-organic compound as disclosed above; c) mixing the powder with a metallic or semi-metallic particulate compound having a Mohs hardness of less than 3.5; and d) mixing the powder with a particulate lubricant. Step c may optionally, in addition to after step b, be performed before step b, or instead of after step b, be performed before step b.

The core particles provided with a first inorganic insulating layer may be pre-treated with an alkaline compound before it is being mixed with the metal-organic compound. A pre-treatment may improve the prerequisites for coupling between the first layer and second layer, which could enhance both the electrical resistivity and mechanical strength of the magnetic composite component. The alkaline compound may be selected from ammonia, hydroxyl amine, tetraalkyl ammonium hydroxide, alkyl-amines, alkyl-amides. The pre-treatment may be conducted using any of the above listed chemicals, preferably diluted in a suitable solvent, mixed with the powder and optionally dried.

Process for Producing Soft-Magnetic Components

The process for the preparation of soft magnetic composite materials according to the invention comprise: uniaxially compacting the composition according to the invention in a die at a compaction pressure of at least about 600 MPa; optionally pre-heating the die to a temperature below the melting temperature of the added particulate lubricant; ejecting the obtained green body; and optionally heat-treating the body.

The compaction may be cold die compaction, warm die compaction, or high-velocity compaction, preferably a controlled die temperature (50-120° C.) with an unheated powder is used.

The heat-treatment process may be in vacuum, non-reducing, inert or in weakly oxidizing atmospheres, e.g. 0.01 to 3% oxygen, or in steam, which may facilitate the formation of the inorganic network, but without increasing the coercivity of the compact. Optionally the heat treatment is performed in an inert atmosphere and thereafter exposed quickly in an oxidizing atmosphere, such as steam, to build a superficial crust of higher strength. The temperature may be up to 700° C.

The heat treatment conditions shall allow the lubricant to be evaporated as completely as possible. This is normally obtained during the first part of the heat treatment cycle, above about 300 to 500° C. At higher temperatures, the metallic or semi-metallic compound may react with the metal-organic compound and partly form a glassy network. This would further enhance the mechanical strength, as well as the electrical resistivity of the component. At maximum temperature (600-700° C.), the compact may reach complete stress release at which the coercivity and thus the hysteresis loss of the composite material is minimized.

The compacted and heat treated soft magnetic composite material prepared according to the present invention preferably have a content of P between 0.01-0.1% by weight of the component, a content of added Si to the base powder between 0.02-0.12% by weight of the component, and a content of Bi between 0.05-0.35% by weight of the component.

The invention is further illustrated by the following examples.

EXAMPLE 1

An iron-based water atomised powder having an average particle size of about 220 μm and less than 5% of the particles having a particle size below 45 μm (40 mesh powder). This powder, which is a pure iron powder, was first provided with an electrical insulating thin phosphorus-based layer (phosphorous content being about 0.045% per weigth of the coated powder.) Thereafter it was mixed by stirring with 0.2% by weight of an oligomer of an aminoalkyl-alkoxy silane (Dynasylan®1146, Evonik Ind.). The composition was further mixed with 0.2% by weight of a fine powder of bismuth (III) oxide. Corresponding powders without surface modification using silane and bismuth, respectively, were used for comparison. The powders were finally mixed with a particulate lubricant, EBS, before compaction. The amount of the lubricant used was 0.3% by weight of the composition.

Magnetic toroids with an inner diameter of 45 mm and an outer diameter of 55 mm and a height of 5 mm were uniaxially compacted in a single step at two different compaction pressures 800 and 1100 MPa, respectively; die temperature 60° C. After compaction the parts were heat treated at 650 ° C. for 30 minutes in nitrogen. The reference materials have been treated at 530° C. for 30 minutes in air (A6, A8) and steam (A7). The obtained heat treated toroids were wound with 100 sense and 100 drive turns. The magnetic measurements were measured on toroid samples having 100 drive and 100 sense turns using a Brockhaus hysterisisgraph. The total core loss was measured at 1 Tesla, 400 Hz and 1000 Hz, respectively. Transverse Rupture Strength (TRS) was measured according to ISO 3995. The specific electrical resistivity was measured on the ring samples by a four point measuring method.

The following table 1 demonstrates the obtained results:

TABLE 1

| Sample | Density ($g/cm^3$) | Resistivity (μOhm.m) | B10 k (T) | Maximal Permeability | Core loss/cycle at 1T and 200 Hz (W/kg) | DC-Loss/cycle at 1T and 1 kHz (W/kg) | Core loss/cycle at 1T and 1 kHz (W/kg) | TRS (MPa) |
|---|---|---|---|---|---|---|---|---|
| According to the invention | | | | | | | | |
| A1. (800 MPa) | 7.47 | 480 | 1.54 | 580 | 16 | 71 | 108 | 60 |
| A2. (1100 MPa) | 7.56 | 530 | 1.59 | 610 | 14 | 68 | 105 | 60 |
| Comparative examples | | | | | | | | |
| A3. Without phosphate (1100 MPa) | 7.57 | 65 | 1.61 | 650 | 23 | 69 | 124 | 65 |
| A4. Without Resin (1100 MPa) | 7.57 | 100 | 1.60 | 570 | 17 | 68 | 116 | 40 |
| A5. Without $Bi_2O_3$ (1100 MPa) | 7.57 | 120 | 1.60 | 580 | 17 | 69 | 116 | 70 |
| Reference examples | | | | | | | | |
| A6. Somaloy ® 700 (0.4% Kenolube ®; 800 MPa) | 7.48 | 400 | 1.53 | 650 | 20 | 97 | 131 | 41 |
| A7. Somaloy ® 3P (0.3% Lube *; 1100 MPa) | 7.63 | 290 | 1.64 | 750 | 21 | 94 | 132 | 100 |
| A8. Somaloy ®3P (0.3% Lube *; 1100 MPa) | 7.63 | 320 | 1.65 | 680 | 19 | 88 | 124 | 60 |

* Lube: the lubricating system of Somaloy ®3P materials.

The magnetic and mechanical properties are negatively affected if one or more of the coating layers are excluded. Leaving out the phosphate-based layer will give unacceptable electrical resistivity, thus high Eddy current losses (A3). Leaving out the metal-organic compound will either give unacceptable electrical resistivity or mechanical strength (A4, A5).

As compared to existing commercial reference material, such as Somaloy®700 or Somaloy®3P obtained from Höganäs AB, Sweden (A6-A8), the composite materials of the present invention can be heat treated at a higher temperature thereby decreasing the hysteresis loss (DC-loss/cycle) considerably.

EXAMPLE 2

An iron-based water atomised powder having an average particle size of about 95 μm and 10-30% less than 45 μm (100 mesh powder) with an apparent density of 3.3 g/$cm^3$, the iron particles surrounded by a phosphate-based electrically insulating coating, was used as starting material. The coated powder was further mixed by stirring with 0.2% by weight of an aminoalkyl-trialkoxy silane (Dynasylan®Ameo), and thereafter 0.2% by weight of an oligomer of an aminoalkyl/alkyl-alkoxy silane (Dynasylan®1146), both produced by Evonik Ind. The composition was further mixed with 0.2% by weight of a fine powder of bismuth (III) oxide. The powders were finally mixed with a particulate lubricant, EBS, before compaction. The amount of the lubricant used was 0.4% by weight of the composition. The powder compositions were further processed as described in example 1, but using 600 and 800 MPa, respectively. Table 2 shows the obtained results.

TABLE 2

| Sample | Density (g/$cm^3$) | Resistivity (μOhm.m) | B10 k (T) | Maximal Permeability | Core loss at 1 T and 200 Hz (W/kg) | DC-Loss at 1 T and 1 kHz (W/kg) | Core loss at 1 T and 1 kHz (W/kg) | TRS (MPa) |
|---|---|---|---|---|---|---|---|---|
| According to the invention | | | | | | | | |
| B1. (600 MPa) | 7.21 | 280 | 1.42 | 450 | 22 | 84 | 107 | 75 |
| B2. (800 MPa) | 7.36 | 320 | 1.50 | 480 | 20 | 81 | 99 | 79 |
| Comparative example | | | | | | | | |
| B3. Somaloy ® 500 (0.5% Kenolube ®; 800 MPa) | 7.37 | 450 | 1.45 | 400 | 22 | 121 | 139 | 40 |

EXAMPLE 3

The same base powder as in example 1 was used having the same phophorous-based insulating layer. This powder was mixed by stirring with different amounts of first a basic aminoalkyl-alkoxy silane (Dynasylan®Ameo) and thereafter with an oligomer of an aminoalkyl/alkyl-alkoxy silane (Dynasylan®1146), using a 1:1 relation, both produced by Evonik Ind. The composition was further mixed with different amounts of a fine powder of bismuth (III) oxide (>99 wt %; $D_{50}$~0.3 μm). Sample C5 is mixed with a $Bi_2O_3$ with lower purity and larger particle size (>98 wt %; $D_{50}$~5 μm). The powders were finally mixed with different amounts of amide wax (EBS) before compaction at 1100 MPa. The powder compositions were further processed as described in example 1. The results are displayed in table 3 and show the effect on the magnetic properties and mechanical strength (TRS).

TABLE 3

| Sample | Tot. metal-organic compound (wt %) | $Bi_2O_3$ (wt %) | EBS (wt %) | Density (g/$cm^3$) | Resistivity (μΩ · m) | B10 k (T) | Max Permeability | AC-loss at 1 T, 1 kHz (W/kg) | DC-loss at 1 T and 1 kHz (W/kg) | TRS (MPa) |
|---|---|---|---|---|---|---|---|---|---|---|
| C1 | 0.10 | 0.10 | 0.20 | 7.67 | 80 | 1.65 | 650 | 54 | 68 | 28 |
| C2 | 0.30 | 0.10 | 0.20 | 7.61 | 180 | 1.62 | 600 | 48 | 70 | 33 |
| C3 | 0.30 | 0.30 | 0.20 | 7.62 | 230 | 1.61 | 590 | 39 | 71 | 55 |
| C4 | 0.30 | 0.30 | 0.40 | 7.50 | 1200 | 1.52 | 410 | 38 | 82 | 53 |
| C5 | 0.20 | 0.20 | 0.30 | 7.57 | 220 | 1.60 | 570 | 41 | 68 | 65 |
| C6 | 0.20 | 0.20 | 0.30 | 7.57 | 620 | 1.59 | 620 | 35 | 68 | 60 |

The samples C1 to C4 illustrate the effect of using different amounts of metal-organic compound, bismuth oxide, or lubricant. In sample C5 the electrical resistivity is lower, but the TRS is slightly improved, as compared to sample C6.

EXAMPLE 4

The same base powder as in example 1 was used having the same phophorous-based insulating layer, except for samples D10 (0.06 wt % P) and D11 (0.015 wt % P). The powder samples D1 to D11 were further treated according to table 4. All samples were finally mixed with 0.3 wt % EBS and compacted to 800 MPa. The soft magnetic components were thereafter heat treated at 650° C. for 30 minutes in nitrogen.

Sample D1 to D3 illustrate that either the layer 2-1 or 2-2 can be omitted, but the best results will be obtained by combining both layers. Sample D4 and D5 illustrate pre-treated powders using diluted ammonia followed by drying at 120° C., 1 h in air. The pre-treated powders were further mixed with amine-functional oligomeric silanes, giving acceptable properties.

The samples D10 and D11 illustrate the effect of the phosphorous content of layer 1. Dependent on the properties of the base powder, such as particle size distribution and particle morphology, there is an optimum phosphorous concentration (between 0.01 and 0.1 wt %) in order to reach all desired properties.

EXAMPLE 5

The same base powder as in example 1 was used having the same phophorous-based insulating layer. All three samples were processed similarly as sample D1, except for the addition of the metallic compound is different. Sample E1 illustrate that the electrical resistivity is improved if calcium carbonate is added in minor amount to bismuth (III) oxide. Sample E2 demonstrate the effect of another soft, metallic compound, $MoS_2$.

In contrast to addition of abrasive and hard compounds with Mohs hardness below 3.5, addition of abrasive and hard compounds with Mohs hardness well above 3.5, such as corundum ($Al_2O_3$) or quartz ($SiO_2$) (E3), in spite of being nano-sized particles, the soft magnetic properties will be unacceptable due to poor electrical resistivity and mechanical strength.

TABLE 4

| No | | Metal-organic compound (layer 2:1) | Amount per weight | Metal-organic compound (layer 2:2) | Amount per weight | Glass former | Amount per weight | Density | Resistivity | Max permability | TRS (MPa) |
|---|---|---|---|---|---|---|---|---|---|---|---|
| D1 | Inven. | aminopropyl-trialkoxysilane | 0.15% | Oligomer of aminopropyl/propyl-alkoxysilane | 0.15% | $Bi_2O_3$ (>99%, D50 0.3 μm) | 0.2% | 7.47 | 700 | 560 | 62 |
| D2 | Inven. | No | 0% | Oligomer of aminopropyl/propyl-alkoxysilane | 0.3% | $Bi_2O_3$ (>99%, D50 0.3 μm) | 0.2% | 7.47 | 500 | 540 | 55 |
| D3 | Inven. | aminopropyl-trialkoxysilane | 0.3% | No | 0% | $Bi_2O_3$ (>99%, D50 0.3 μm) | 0.2% | 7.47 | 700 | 550 | 53 |
| D4 | Inven. | Pre-treatment * | 0% | Oligomer of aminopropyl/propyl-alkoxysilane | 0.3% | $Bi_2O_3$ (>99%, D50 0.3 μm) | 0.2% | 7.47 | 500 | 530 | 60 |
| D5 | Inven. | Pre-treatment * AND 0,15% MTMS or TEOS | 0.15% | Oligomer of aminopropyl/propyl-alkoxysilane | 0.15% | $Bi_2O_3$ (>99%, D50 0.3 μm) | 0.2% | 7.47 | 450 | 535 | 60 |
| D6 | Inven. | Vinyl-triethoxysilane | 0.15% | Oligomer of aminopropyl/propyl-alkoxysilane | 0.15% | $Bi_2O_3$ (>99%, D50 0.3 μm) | 0.2% | 7.47 | 140 | 450 | 43 |
| D7 | Inven. | Aminopropyl-trialkoxysilane | 0.15% | Oligomer of propyl-alkoxysilan or diethoxy-silane | 0.15% | $Bi_2O_3$ (>99%, D50 0.3 μm) | 0.2% | 7.42 | 160 | 480 | 55 |
| D8 | Comp. ** | vinyl-triethoxysilane | 0.15% | Oligomer of vinyl/alkyl-alkoxysilane | 0.15% | $Bi_2O_3$ (>99%, D50 0.3 μm) | 0.2% | 7.41 | 26 | 350 | 21 |
| D9 | Inven. | Mercaptopropyl-trialkoxysilane | 0.15% | Oligomer of aminopropyl/propyl-alkoxysilane | 0.15% | $Bi_2O_3$ (>99%, D50 0.3 μm) | 0.2% | 7.47 | 600 | 565 | 60 |
| D10 *** | Inven. | aminopropyl-trialkoxysilane | 0.15% | Oligomer of aminopropyl/propyl-alkoxysilane | 0.15% | $Bi_2O_3$ (>99%, D50 0.3 μm) | 0.2% | 7.46 | 350 | 525 | 61 |
| D11 **** | Inven. | aminopropyl-trialkoxysilane | 0.15% | Oligomer of aminopropyl/propyl-alkoxysilane | 0.15% | $Bi_2O_3$ (>99%, D50 0.3 μm) | 0.2% | 7.48 | 200 | 605 | 60 |

* Pre-treatment using $NH_3$ in acetone followed by drying at 120° C., 1 h in air.;

** Sample D8 not including a Lewis base-functionalized metal-organic compounds;

*** Layer 1 containing 0.06 wt. % P;

**** Layer 1 containing 0.015 wt. % P.

TABLE 5

| No | | Metal-organic compound (layer 2:1) | Amount per weight | Metal-organic compound (layer 2:2) | Amount per weight | Glass former | Amount per weight | Density | Resistivity | Max permability | TRS (MPa) |
|---|---|---|---|---|---|---|---|---|---|---|---|
| E1 | Inven. | aminopropyl-trialkoxysilane | 0.15% | Oligomer of aminopropyl/propyl-alkoxysilane | 0.15% | $Bi_2O_3/CaCO_3$ (3:1) (>99%, D50 0,3 μm) | 0.2% | 7.57 | 1050 | 560 | 65 |
| E2 | Inven. | aminopropyl-trialkoxysilane | 0.15% | Oligomer of aminopropyl/propyl-alkoxysilane | 0.15% | $MoS_2$ (>99%, D50 1 μm) | 0.2% | 7.57 | 650 | 500 | 45 |
| E3 | Comp. | aminopropyl-trialkoxysilane | 0.15% | Oligomer of aminopropyl/propyl-alkoxysilane | 0.15% | $SiO_2$ (>99%, D50 0,5 μm) | 0.2% | 7.57 | 45 | 630 | 23 |

The invention claimed is:

1. A ferromagnetic powder composition comprising soft magnetic iron-based core particles, wherein the surface of the core particles is provided with a first phosphorus-based inorganic insulating layer and at least one metal-organic layer, located outside the first layer, of a metal-organic compound having the following general formula:

$$R_1[(R_1)_x(R_2)_y(MO_{n-1})]_nR_1$$

wherein M is a central atom selected from Si, Ti, Al, or Zr;

O is oxygen;

$R_1$ is a hydrolysable group;

$R_2$ is an organic moiety and wherein at least one $R_2$ contains at least one amino group; wherein n is the number of repeatable units being an integer between 1 and 20;

wherein the x is an integer between 0 and 1;

wherein y is an integer between 1 and 2;

wherein a metallic or semi-metallic particulate compound having a Mohs hardness of less than 3.5 is adhered to at least one metal-organic layer;

and wherein the powder composition further comprises a particulate lubricant.

2. The composition according to claim 1 , wherein said metal-organic compound in one metal-organic layer is a monomer (n=1).

3. The composition according to claim 1, wherein said metal-organic compound in one metal-organic layer is an oligomer (n=2-20).

4. The composition according to claim 1, wherein $R_1$ in the metal-organic compound is an alkoxy group having less than 4carbon atoms.

5. The composition according to claim 1, wherein $R_2$ includes 1-6carbon atoms.

6. The composition according to claim 1, wherein the $R_2$-group of the metal-organic compound includes one or more hetero atoms selected from the group consisting of N, O, S, and P.

7. The composition according to claim 1, wherein $R_2$ includes one or more of the following functional groups:

amine, diamine, amide, imide, epoxy, mercapto, disulfido, chloroalkyl, hydroxyl, ethylene oxide, ureido, urethane, isocyanato, acrylate, glyceryl acrylate.

8. The composition according to claim 1, wherein the metal-organic compound is a monomer selected from trialkoxy and dialkoxy silanes, titanates, aluminates, or zirconates.

9. The composition according to claim 1, wherein the metal-organic compound is an oligomer selected from alkoxy-terminated alkyl/alkoxy oligomers of silanes, titanates, aluminates, or zirconates.

10. The composition according to claim 3, wherein the oligomer of the metal-organic compound is selected from the group consisting of alkoxy-terminated amino-silsesquioxanes, amino-siloxanes, oligomeric 3-aminopropyl-alkoxy-silane, 3-aminopropyl/propyl-alkoxy-silane, N-aminoethyl-3-aminopropyl-alkoxy-silane, N-aminoethyl-3-aminopropyl/methyl-alkoxy-silane, and mixtures thereof.

11. The composition according to claim 1, wherein the metallic or semi-metallic particulate compound is bismuth.

12. A process for the preparation of a ferromagnetic powder composition comprising:

a) mixing soft magnetic iron-based core particles, the surface of the core particles being electrically insulated by a phosphorous-based inorganic insulating layer, with a metal-organic compound according to claim 1;

b) optionally mixing the obtained particles with a further metal-organic compound;

c) mixing the powder before or after step b) or instead of step b) with a metallic or semi-metallic particulate compound having a Mohs hardness of less than 3.5; and d) mixing the powder with a particulate lubricant.

13. The ferromagnetic powder composition obtainable according to claim 12.

14. A process for the preparation of soft magnetic composite materials comprising:

a) uniaxially compacting a composition according to any one claim 1 in a die at a compaction pressure of at least about 600 MPa;

b) optionally pre-heating the die to a temperature below the melting temperature of an added particulate lubricant;

c) ejecting the obtained green body; and d) optionally heat-treating the body.

15. The compacted and heat treated soft magnetic composite material prepared according to claim 14 having a content of P between 0.01-0.1% by weight of the component, a content of added Si to the base powder between 0.02-0.12% by weight of the component, and a content of Bi between 0.05-0.35% by weight of the component.

16. The composition according to claim 2, wherein said metal-organic compound in one metal-organic layer is an oligomer (n=2-20).

17. The composition according to claim 1, wherein $R_1$ in the metal-organic compound is an alkoxy group having less than 3 carbon atoms.

18. The composition according to claim 2, wherein $R_1$ in the metal-organic compound is an alkoxy group having less than 4 carbon atoms.

19. The composition according to claim 1, wherein $R_1$ in the metal-organic compound is an alkoxy group having less than 3 carbon atoms.

20. The composition according to claim 1, wherein the metallic or semi-metallic particulate compound is bismuth (III) oxide.

* * * * *